United States Patent [19]

Melfi et al.

[11] Patent Number: 4,675,056
[45] Date of Patent: Jun. 23, 1987

[54] SUBMERGED ARC WELDING FLUX

[75] Inventors: Teresa Melfi, Mentor; Ronald F. Young, Willoughby; Dennis D. Crockett, Mentor, all of Ohio

[73] Assignee: The Lincoln Electric Company, Cleveland, Ohio

[21] Appl. No.: 892,499

[22] Filed: Aug. 1, 1986

[51] Int. Cl.⁴ .............................................. B23K 35/34
[52] U.S. Cl. ......................................... 148/24; 148/26
[58] Field of Search .................................. 148/24, 26

[56] References Cited

U.S. PATENT DOCUMENTS 2,694,023  11/1954  Hopkins ................................ 148/26
2,895,863   7/1959  Stringham .......................... 148/26

*Primary Examiner*—Peter D. Rosenberg
*Attorney, Agent, or Firm*—Body, Vickers & Daniels

[57] ABSTRACT

An agglomerated submerged arc welding flux which results in low weld metal oxygen and the concomitant high impact values while retaining the good welding characteristics of the lower basicity (acid) fluxes such as welding at higher speeds on various joint configurations with less undercutting and slag entrapment along with good slag removal. The flux contains high percentages of calcium fluoride and aluminum oxide in combination with other ingredients having a limited amount of available oxygen and sufficient acid components to lower the basicity index of the flux below 1.25. Additionally, no potent deoxidizers such as magnesium, titanium or aluminum are required.

3 Claims, No Drawings

SUBMERGED ARC WELDING FLUX

This invention pertains to the art of electric arc welding and, more particularly, to an improved formulation for a granular flux to be used in the submerged arc welding of low carbon steels.

BACKGROUND

In the electric arc welding of steels, it is conventional to deposit a windrow of granulated flux on the seam to be welded and then to advance an electrically energized low carbon steel electrode through the windrow to establish an arc between the end of the electrode and the edges of the seam to be welded. The arc melts these edges and the end of the electrode to form a molten weld pool. At the same time, it melts some of the granular flux which floats on top of the molten weld bead and solidifies after the molten steel in the weld pool puddle thus shaping the surface of the solidified weld bead and giving it an appropriate surface texture.

These fluxes in the past have been mixtures of various known fluxing ingredients such as: the fluorides of calcium and potassium; the oxides of aluminum, silicon, manganese, titanium, zirconium and the like; and, sometimes deoxidizers, all in carefully controlled portions selected to give: a desired solidifying temperature to the molten slag; desired slag removal characteristics; and, most importantly, desired mechanical properties to the deposited weld bead.

The various flux ingredients in powdered form are normally thoroughly intermixed and then either: fused by heating to a temperature where all of the ingredients melt and react with one another, are cooled and crushed to the desired particle size; or, agglomerated where a low melting temperature binder, such as sodium silicate, is added to the mixture and the mixture is then heated, binding the other particles in unreacted state into granules of the desired size.

Fused fluxes are more expensive to manufacture because of the greater energy requirements to melt all of the ingredients or sophisticated equipment to withstand the higher temperatures and the additional step of cooling and crushing the liquid mass. Additionally, the fused fluxes are more expensive to use because a greater amount melts during the welding. The present invention is an agglomerated flux although the principles on which the present invention excels may also apply to fused flux formulations. On the other hand, the formulations used in fused fluxes are often not usable in agglomerated fluxes.

The mechanical characteristics required of a weld bead are normally good tensile strengths and now, more importantly, high impact strengths as measured by various established recognized testing techniques such as the Charpy Impact test.

In such a test, a specimen of prescribed size is taken from the weld bead, notched and then subjected to an impact sufficient to break the specimen at the notch. The higher the energy to fracture the specimen, the higher the impact value.

One expedient adopted heretofore for increasing the notch toughness of the weld metal was the inclusion of various known potent metallic deoxidizers or alloys in the welding flux which would combine with oxygen in the weld pool and would then become part of the slag thereby decreasing the weld metal oxygen content. However, the inclusion of potent metallic deoxidizers such as aluminum or titanium in either a fused or agglomerated flux is difficult because they readily oxidize at the temperatures used to manufacture flux. Adding them after the flux has been fired and sized presents a problem of these elements settling out in the fluxes during shipment or handling. Additionally, the amount of metallic deoxidizers used must be carefully controlled as any excess will be recovered in the weld deposit and, in multi-pass welding, increase with each pass ultimately reaching a point where the amount becomes excessive with detrimental effects on the mechanical properties.

Research has shown that, as the oxygen content of the weld bead is reduced, the Charpy Impact values increase. The oxygen may be present in the weld bead in the form of oxides of iron or of any of the metals contained in the welding flux, electrode, or base metal. These oxides, if present in the weld bead, appear as microscopic particles which fail to float to the surface of the molten weld metal before it solidifies and thus remain interspersed throughout the weld metal along the grain boundaries resulting in potential low energy fracture regions in the solidified steel.

Heretofore, research has shown that in order to progressively reduce the oxygen content of the weld metal without the limitations of metallic deoxidizers, it has been necessary to progressively increase the basicity of the flux.

This phenomenon has been explored and proven time and again leading to several equations to calculate basicity and thereby estimate the result of oxygen in the weld metal and the impact values of the weld metal.

The problem has been that fluxes of high basicity generally have poor welding characteristics. These fluxes have included higher and higher amounts of the basic flux ingredients, such as calcium fluoride, calcium oxide and magnesium oxide, and less and less of the acid flux ingredients, such as silicon dioxide. They have been unable to produce quality welds in much more than an open butt joint.

It is known that low basicity fluxes in general weld at higher speeds on various joint configurations with less undercutting and slag entrapment. Also, lower basicity fluxes generally have good slag removal which allows their use in small tight (small angle) joints, deep grooves or fillets. However, such fluxes, prior to this invention, have been unable to produce welds with low levels of oxygen and high impact strength. Thus, heretofore to obtain good notch toughness of the weld bead, the welding operator has had to use high basicity fluxes and sacrifice welding speed, weld bead appearance, and general operator appeal to meet these stringent specifications.

THE INVENTION

The present invention contemplates a flux formulation which overcomes all of the above-referred to difficulties and provides an acid flux which has excellent weld bead appearance, easy slag removal and higher speed welding, while at the same time producing a weld metal deposit with high notch toughness. This is done by controlling the oxygen content of the weld metal.

In accordance with the invention, a welding flux formulation for submerged arc welding of steel is provided which includes: one or more of the fluorides of calcium, lithium, aluminum, magnesium, potassium, sodium or barium, in total amounts of from 10% to 30%; aluminum oxide in total amounts of from 20% to 50%; limiting the available oxygen in the flux to less than 5%; and, then selecting oxide components from the class consisting of titanium, silicon, magnesium, manganese, zirconium, calcium, sodium, potassium, strontium, lithium, and barium so as to adjust the slag freezing range and composition for the desired welding characteristics while maintaining a basicity index for the flux of less than 1.25.

The basicity index used herein is that set forth by Tuliani et al in the publication *Welding and Metal Fabrication, August,* 1969, pp. 327–339, which is essentially as follows:

$$BI \text{ (Basicity Index)} = \frac{CaO + MgO + BaO + SrO + Na_2O + K_2O + Li_2O + CaF_2 + \frac{1}{2}(MnO + FeO)}{SiO_2 + \frac{1}{2}(Al_2O_3 + TiO_2 + ZrO_2)}$$

(hereinafter in this specification and claims, Formula A) where MgO means the weight percent magnesium oxide in the flux and CaO means the weight percent calcium oxide in the flux, etc.

A further known method of calculating the basicity has been proposed in an article by Mori in a publication entitled *Japanese Institute of Metals,* 1960, 24, pp. 383–386 as follows:

$$B_L \text{(Basicity Number)} = -6.31(SiO_2) - 4.97(TiO_2) - 0.2(Al_2O_3) + 3.4(FeO) + 4.0(MgO) + 4.8(MnO) + 6.05(CaO)$$

where (MgO) means the mole percentage of magnesium oxide in the flux and (CaO) means the mole percentage of calcium oxide in the flux, etc.

In accordance with the present invention, the basicity index of this flux is less than 1.25 and the basicity number ($B_L$) of this flux is less than 50. This type of flux is generally referred to as an acid or neutral/acid flux.

It is to be noted that the flux formulation does not include any of the potent deoxidizers, such as titanium, aluminum, or magnesium. While these metals can serve to lower the weld metal oxygen without affecting the flux basicity, they are far more expensive than the ingredients used in fluxes formulated in accordance with this invention. In addition, deoxidizers such as aluminum and titanium can have an adverse effect in that when they do not all react to become part of the slag, they can adversely alloy the weld metal causing embrittlement and cracking. The present invention does not require such deoxidizers.

It is to be further noted that, using the present invention, the low weld metal oxygen is achieved in great part by the high fluoride level which exhibits a fluxing or cleansing action on the molten weld pool. Because of this, the present invention does not require substantial amounts of metallic deoxidants to achieve low weld metal oxygen levels and good weld bead appearance. The weld metal does not exhibit significant variations in alloy content, particularly manganese and silicon, with variations in the amount of flux melted resulting from welding parameter changes. Fluxes which exhibit this desirable feature are known as neutral fluxes. Neutral fluxes can be defined as those fluxes having a Wall Neutrality Number of 25 or less.

The Wall Neutrality Number is calculated by taking two all weld metal samples from AWS type plates. One of these plates is run at 28 volts and one at 36 volts. The Wall Number is the addition of the absolute change of manganese in these two welds and the absolute change in silicon in these times 100, as shown by the following formula:

$$N_{WALL} = (|Mn_{36} v - Mn_{28} v| + |Si_{36} v - Si_{28} v|) \times 100$$

Using the present invention with an agglomerated flux having a basicity index of 0.98, weld metal oxygen tests on four samples had a range of 470 ppm to 330 ppm with an average of 397 ppm A further requirement of the above invention is to limit the available oxygen in the flux. Available oxygen is defined here as any oxygen that is bonded to any element or substance where the free energy of formation of the oxides ($\Delta G$) is less negative than that of $Si + O_2 \rightarrow SiO_2$ at any point between 1600° C. and 2000° C. In the present invention, the available oxygen is limited to less than 5% by weight of the total flux. Available oxygen levels greater than this increase the oxygen potential so drastically that even when put in combination with the rest of the invention, the resultant weld metal oxygen is not low enough to give the desired results.

To reach this low amount of available oxygen, some selection of the metal oxides used is necessary. Manganese oxide, if employed, should be in the MnO state rather than $Mn_2O_3$ or $Mn_3O_4$. This is important because MnO is less likely to release oxygen than other less stable forms of manganese oxide. This oxygen can remain in the weld metal as oxygen or an oxide inclusion. Also, if employed, it may be partly shielded from the arc action by reacting it with other acid oxides before incorporating it into the flux mixture.

It is believed this invention is successful for various reasons, but the following theory is described herein for completeness.

During submerged arc welding, oxygen, as well as iron, silicon, manganese and other elements can be found in progressive stages of the process. The first stage is as ions dissolved in the transferring metal. The second is as inclusions suspended in the molten metal of the weld puddle. Lastly, they may be found in the slag.

Metal is heated by the electric arc in the welding process. During solidification, the oxygen (along with silicon, manganese and other elements) is trying to reach equilibrium between that dissolved in the metal, that suspended as inclusions in the metal, and that in the slag. Because of the rapid cooling, equilibrium is not achieved between these areas. If equilibrium were attained, basic steelmaking technology would apply to cleanse the weld.

First, this invention moves the reaction toward equilibrium by creating an eddying environment at the weld puddle. This drives the elements dissolved in the molten weld metal and slag to thermodynamic equilibrium. Secondly, and more importantly, this molten metal movement helps to bring the suspended inclusions to the surface of the molten weld metal, allowing them to be incorporated into the slag. A very clean weld deposit, with very few oxide inclusions results.

It is important to note that the low oxygen content of the weld metal does not come about by additions of the classic potent deoxidants (Mg, Al, Ti, Si, etc.). In the past, to attain a shiny weld bead, free of surface imperfections in a single pass weld, large percentages of these classic metallic deoxidants were added to a flux. These additions made a flux less desirable for multi-pass welding because the unreacted alloy remaining in the weld bead with each pass can ultimately reach extreme levels. The unique way in which this flux is deoxidized requires very little use, if any, of metallic deoxidants to attain a clean weld with good appearance, even after only one pass.

Flux formulations in accordance with the invention are as follows:

| Compound Required | Range | Weight % Preferred |
|---|---|---|
| $Al_2O_3$ | 20 to 50 | 34 |
| $CaF_2$ | 10 to 30 | 22 |
| Optional | | |
| $Mn_xO_y$ | 0 to 15 | 1.5 |
| $Na_2O$ | 0 to 10 | 1.5 |
| Metallic Mn + Si | 0 to 5 | 1.5 |
| Other Oxides | | |
| MgO | 0 to 20 | 10 |
| $SiO_2$ | 5 to 25 | 13 |
| $TiO_2$ | 2 to 25 | 15 |
| Trace Compounds | | Bal. |
| | | 100% |

The $Na_2O$ is normally present combined with some or all of the $SiO_2$ and functions as a binder in the agglomeration of the other ingredients. If the principles of the invention are used in a fused flux, or if another binder is used in agglomeration, the $Na_2O$ would not be required.

The invention has been described in detail and a specific formulation of a flux has been set forth. Obviously, modifications and alterations will occur to others upon a reading and understanding of this specification and it is my intention to include all such modifications and alterations insofar as they come within the scope of the appended claims.

Having described my invention, I claim:

1. An agglomerated flux for use in the electric arc welding of steels using a consumable steel electrode, comprised of: one or more fluorides selected from the class consisting of calcium, potassium, aluminum, magnesium, barium, sodium and lithium in amounts of from 10 to 30 weight percent; aluminum oxide in amounts of from 20 to 50 weight percent; and, other oxides selected from the class consisting of the oxides of sodium, potassium, strontium, lithium, barium, manganese, silicon, magnesium, titanium, zirconium, and calcium, wherein the maximum available oxygen is less than 5 percent and said other oxides are present in amounts to lower the basicity index of the flux to less than 1.25 as calculated by Formula A.

2. The flux of claim 1, having the following range of ingredients:

| Compound | Weight Percent |
|---|---|
| $CaF_2$ | 10 to 30 |
| $Al_2O_3$ | 20 to 50 |
| $Na_2O$ | 0 to 10 |
| $Mn_xO_y$ | 0 to 15 |
| $SiO_2$ | 5 to 25 |
| $TiO_2$ | 2 to 25 |
| MgO | 0 to 20 |
| Metallic Mn + Si | 0 to 5 |

3. The flux of claim 1 having the following ingredients in the approximate amounts stated:

| Compound | Weight Percent |
|---|---|
| $CaF_2$ | 22 |
| $Al_2O_3$ | 34 |
| $Mn_xO_y$ | 1.5 |
| MgO | 10 |
| $SiO_2$ | 13 |
| $TiO_2$ | 15 |
| $Na_2O$ | 1.5 |
| Metallic Mn + Si | 1.5 |

* * * * *